United States Patent [19]

Orlitzky

[11] Patent Number: 4,671,386

[45] Date of Patent: Jun. 9, 1987

[54] LUBRICATING APPARATUS

[76] Inventor: Anton Orlitzky, 5291-6th Avenue, Delta, British Columbia, Canada, V4M 1L6

[21] Appl. No.: 782,504

[22] Filed: Oct. 1, 1985

[51] Int. Cl.$^4$ .............................................. F16N 11/10
[52] U.S. Cl. ...................................... 184/39; 222/389
[58] Field of Search .................. 417/381, 394; 184/39; 222/3, 5, 386.5, 389; 60/39.48; 204/DIG. 6

[56] References Cited

U.S. PATENT DOCUMENTS

| | | | |
|---|---|---|---|
| 2,807,215 | 9/1957 | Hawxhurst | 417/388 |
| 2,924,359 | 2/1960 | Beremand | 222/386.5 |
| 2,979,897 | 4/1961 | Studhalter et al. | 222/389 X |
| 2,984,188 | 5/1961 | Tuckey et al. | 417/394 X |
| 3,430,731 | 3/1969 | Satzinger | 184/39 |
| 3,842,939 | 10/1974 | Satzinger | 184/39 |
| 4,023,648 | 5/1977 | Orlitzky et al. | 184/39 |

Primary Examiner—Leonard E. Smith
Attorney, Agent, or Firm—Christie, Parker & Hale

[57] ABSTRACT

A lubricating apparatus comprising a lubricant chamber with an outlet for lubricant in the chamber. There is a gas generating device to generate gas to develop pressure. The pressure forces lubricant from the chamber. The pressure is applied by a bellows.

11 Claims, 8 Drawing Figures

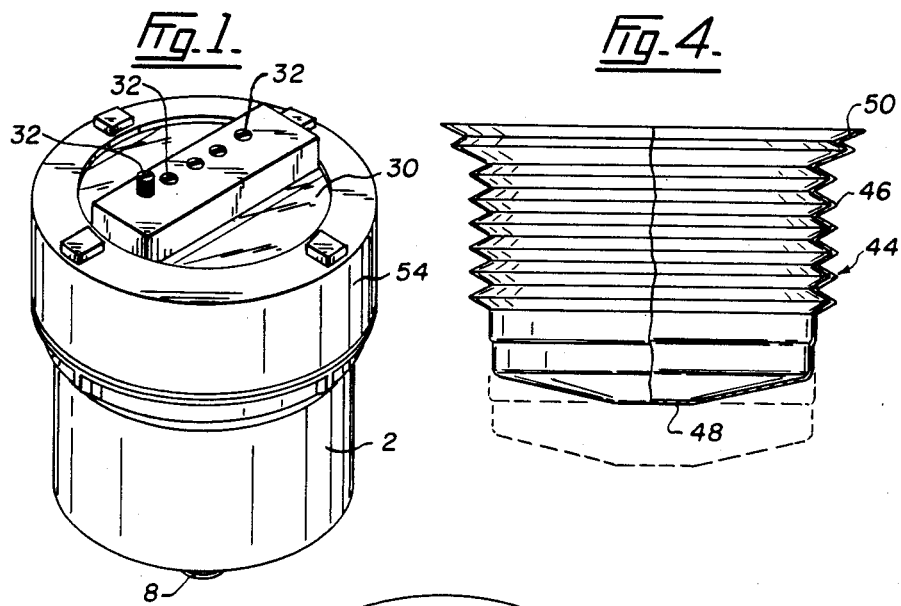
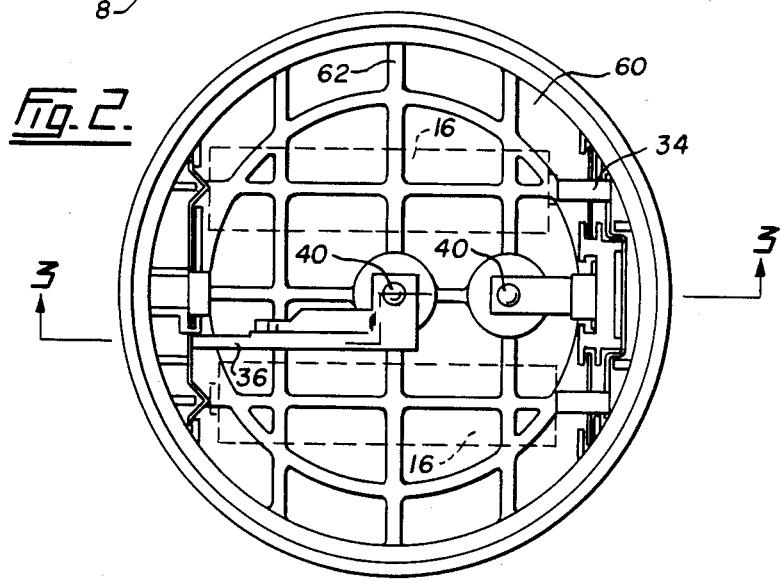
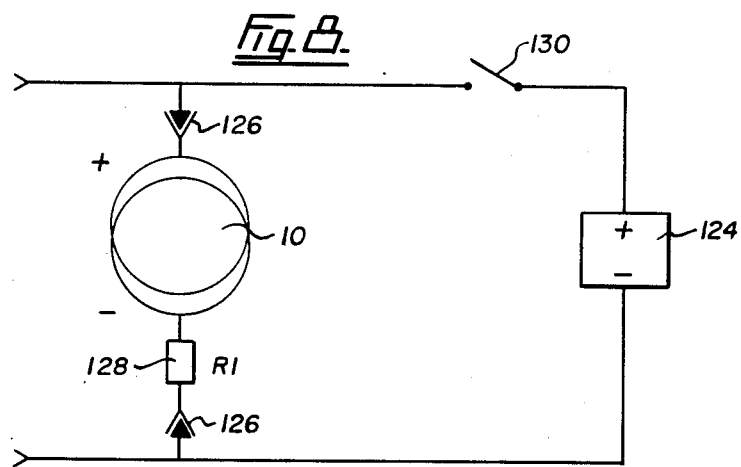

LUBRICATING APPARATUS

FIELD OF THE INVENTION

This invention relates to a lubricating apparatus, particularly an apparatus able to provide grease automatically to a location to be lubricated, for example a bearing, without manual attendance.

DESCRIPTION OF THE PRIOR ART

Automatic greasing apparatus are well known. They provide the great virtue of providing a constant supply of lubricant to a bearing, or indeed anything that needs to be lubricated, without manual interference. That is it is not necessary to keep a schedule of what bearings have been lubricated and what have not and when the bearings should be lubricated. The automatic apparatus simply provides a constant flow of grease.

The principal method of forcing the grease to the place to be lubricated is by gas pressure. The gas pressure may be developed by chemical reaction and the pressure developed, as a result of gas development, is used to force grease from the container, down a grease line to the bearing.

The apparatus is reliable and long-lasting. Indeed apparatus developed by applicant is able to provide lubrication of a bearing for up to 3 years which is extremely desirable, especially where it can be difficult for a man to reach to carry out the necessary lubrication.

In prior art automatic greasing apparatus it is usual to incorporate a neoprene or rubber diaphragm. The gas acts against the diaphragm, stretching it to move a piston to move grease out of a grease chamber.

However there are a number of disadvantages with the use of rubber and neoprene diaphragms principally because such diaphragms do not react in a uniform manner to pressure or to temperature. Furthermore their resistance temperature is not particularly good, especially the resistance to low temperature. As a result the characteristics of the diaphragm can change markedly and this, of course, can have an effect on the lubricating capability of the apparatus.

SUMMARY OF THE INVENTION

The present invention seeks to provide a means of avoiding this inconstant response by providing as part of the greasing apparatus, used to force grease from the apparatus, a component that is able to withstand wide variations in temperature, with a consistent response and, similarly, wide variations in pressure, again with a constant response.

Accordingly the present invention is in a lubricating apparatus comprising a lubricant chamber with an outlet for lubricant in the chamber; a gas generating device to generate gas to develop pressure; means responsive to the pressure to force lubricant from the chamber, and is the improvement whereby the means responsive to the pressure is a bellows.

DRAWINGS

Aspects of the invention are illustrated, merely by way of example, in the accompanying drawings in which:

FIG. 1 is a perspective view of a lubricating apparatus according to the present invention;

FIG. 2 is a bottom plan view of the lubricating apparatus of the invention with its base member removed;

FIG. 4 is a detail of bellows useful in the apparatus of the present invention;

Figure 5:
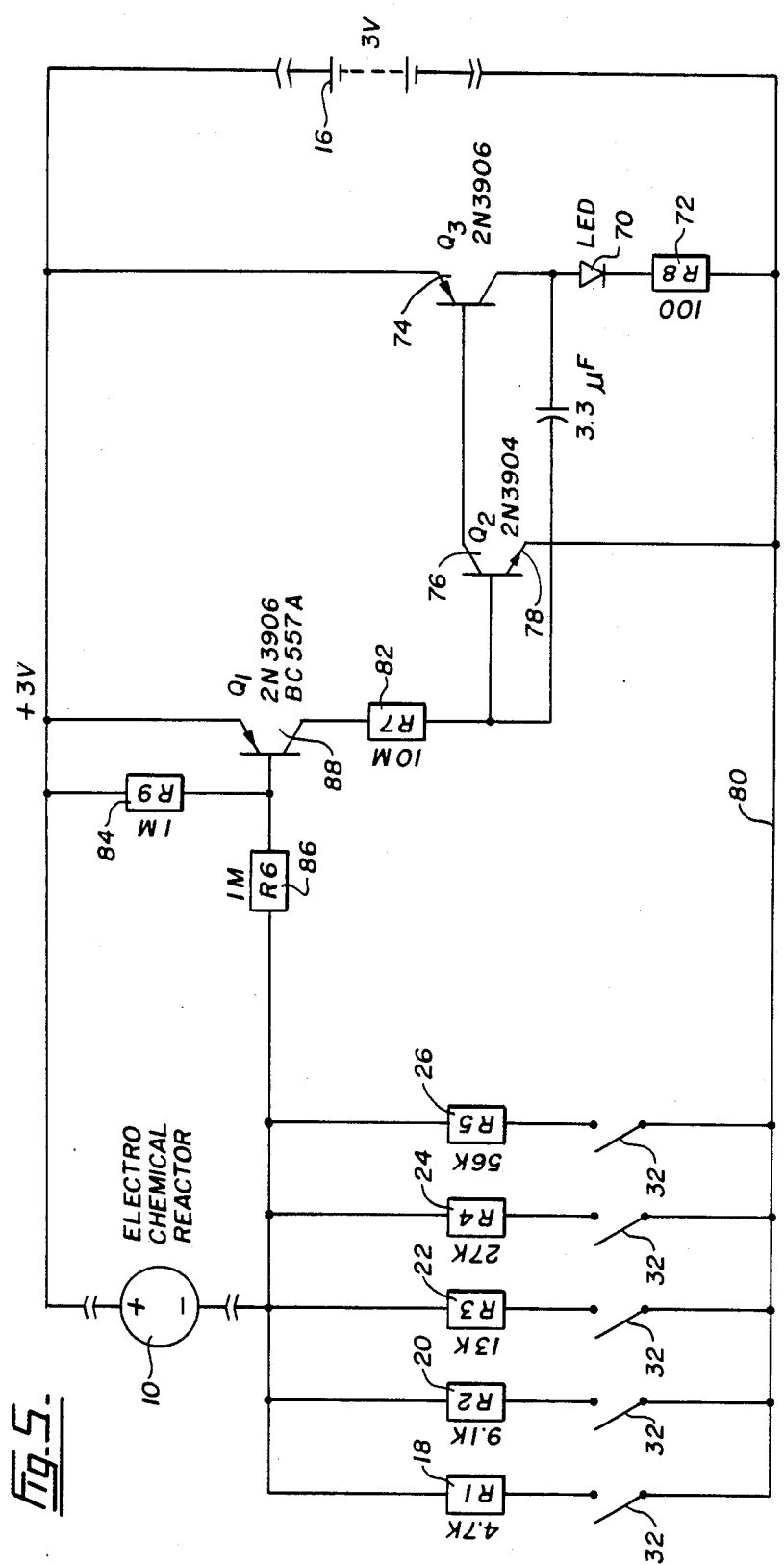
FIG. 5 is a diagram of a circuit useful in controlling the apparatus of the present invention.
Figure 6:
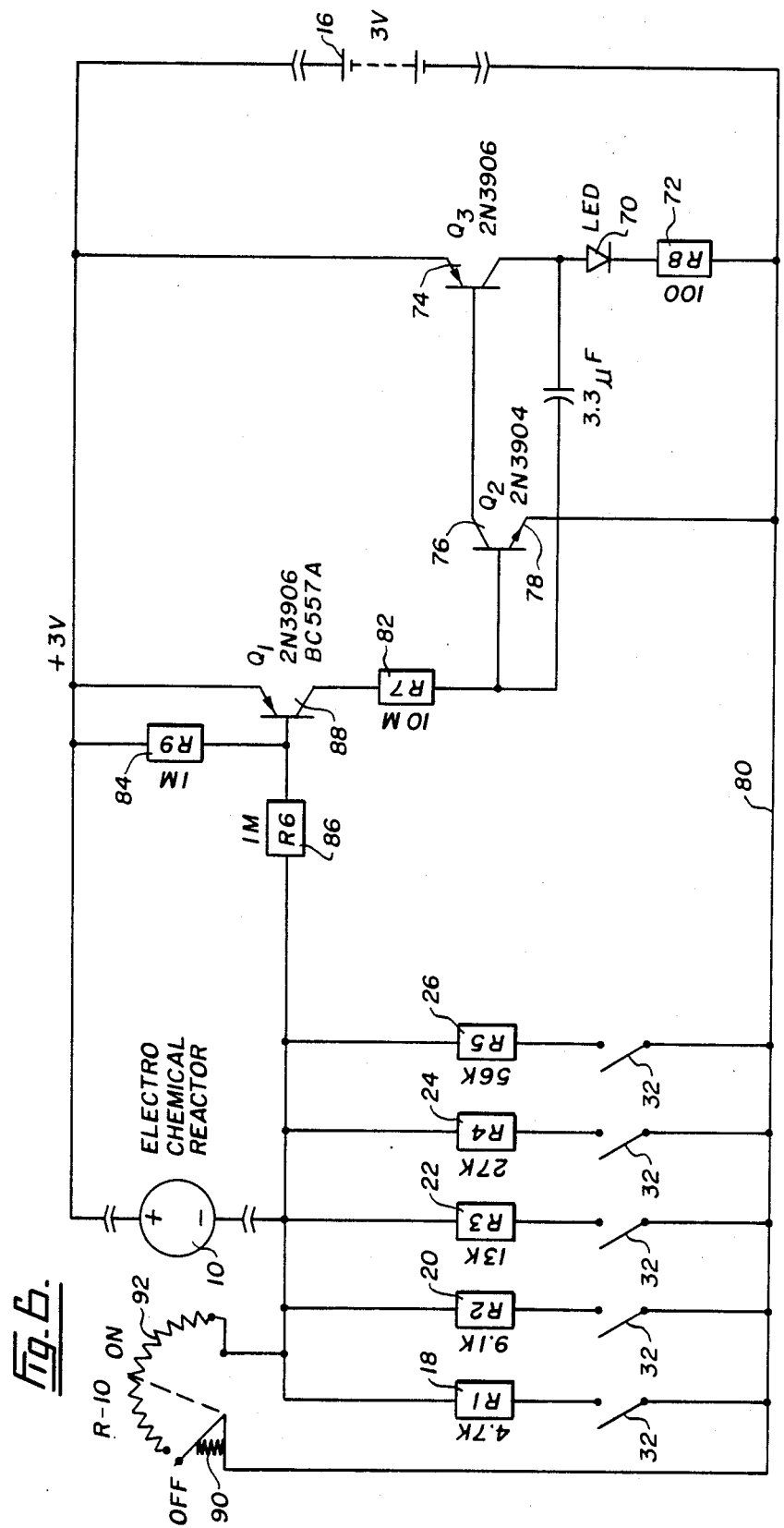
Figure 7:
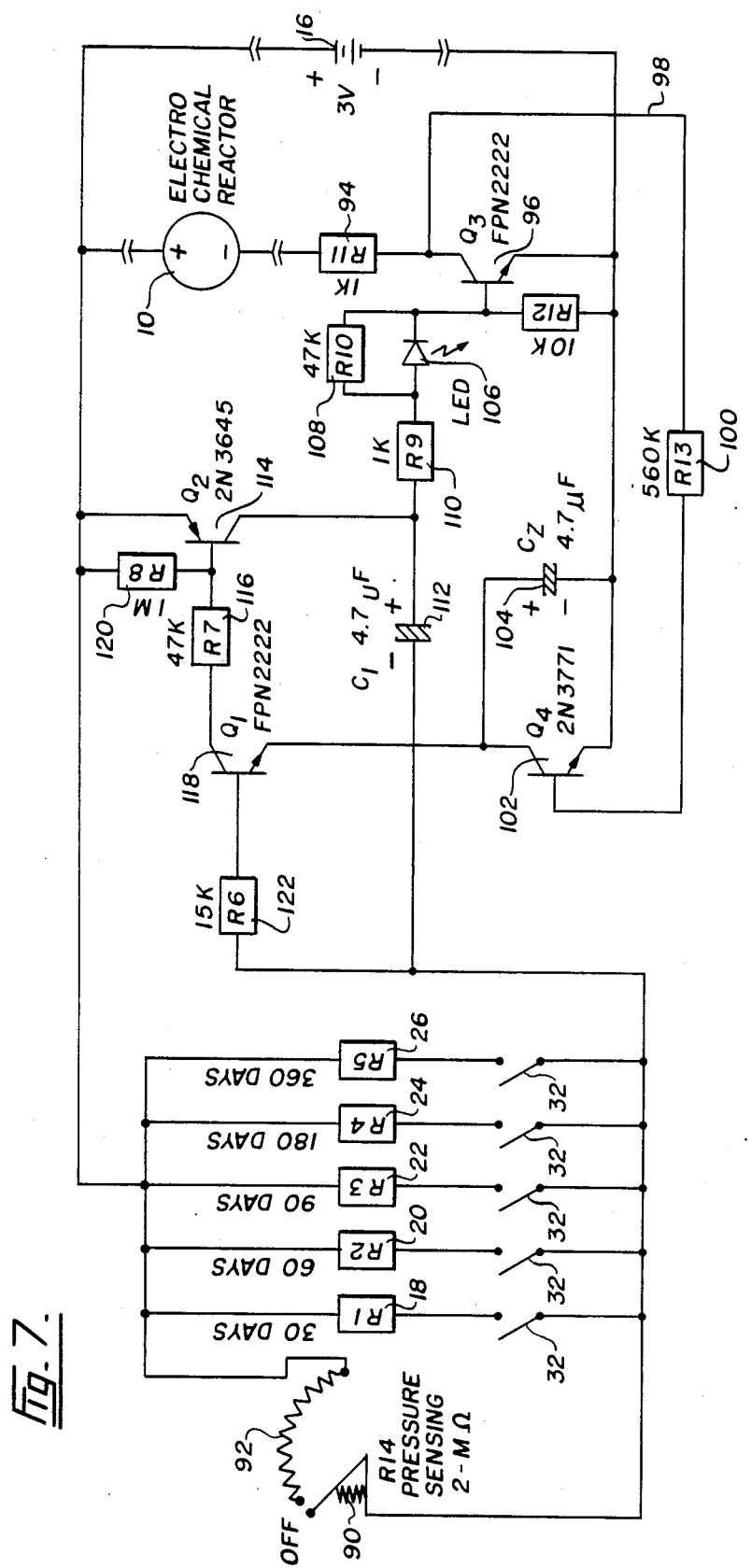

FIG. 6 illustrated a modification of the circuit of FIG. 5;

FIG. 7 illustrates a further modification of the circuit of FIG. 5; and

FIG. 8 illustrates a simple circuit diagram using an external power source.

DESCRIPTION OF THE PREFERRED EMBODIMENTS

Figure 3:
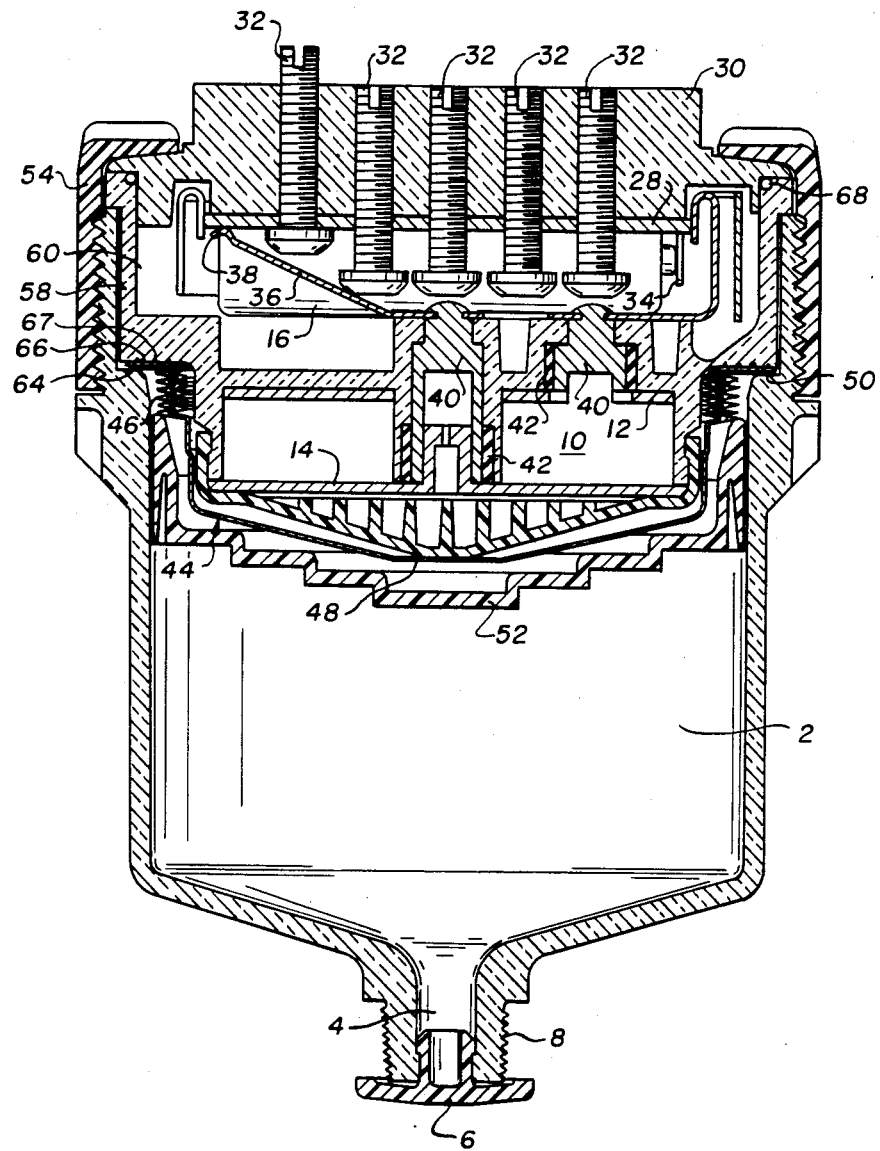
FIG. 3 is a section on the line 3—3 in FIG. 2.

The drawings show a lubricating apparatus comprising, as shown particularly in FIG. 3, lubricant chamber 2 having an outlet 4 for lubricant. In the drawing, which is simply of the apparatus, not in its working position, the outlet 4 is blocked with a plug 6, removed when the device is to be used. A grease line can then be attached on threaded portion 8.

There is a gas generating device to generate gas to develop pressure. These means are well known and may, for example, comprise a reaction chamber 10 having an anode 12 and a cathode 14. Batteries 16 are provided to provide voltage across the anode 12 and the cathode. The reaction chamber 10 may contain any chemical composition that, upon the application of a voltage, generates the gas. Typically, for convenience of storage the reactants are absorbed on a sponge.

There are a plurality of resistors 18 (see FIGS. 4, 5 and 7) between the batteries 16 and the electrodes 12 and 14. Resistors 18, 20, 22, 24 and 26 are mounted in a printed circuit board (PCB) 28 attached to base member 30. The printed circuit board has the resistors 18 to 26 located on it and, of course, communicating with the printed, copper circuit. Screws 32 act as switches. One screw 32 is shown extending externally of the base member 30 so that its head makes a contact for the printed circuit and introduces a resistor into the circuit. The resistors 18 to 26 are a predetermined value as indicated in FIG. 5. Typically the exterior of the device, usually the base member 30, will be marked with an indication of time. That is if one resistor 18 to 26 is brought into contact with by moving a screw 32 so that its head completes the circuit (see the left screw in FIG. 3) then the device will be useful for a certain time, after which all the grease will have been expelled from the chamber.

The batteries 16 contact leads 34 and 36 to supply power to the reaction chamber 10 from the printed circuit board. Conductor member 34 takes the power to the anode 12. Conductor 36 takes power to a conductor 38 on the printed circuit board 28 to the cathode 14. The arrangement is conventional, that is the printed circuit board is entirely conventional and not in any way form a part of the present invention. Current is conducted to the reaction chamber 10 through metallic studs 40, insulated from the remainder of the structure by insulating members 42.

The apparatus includes means responsive to the pressure generated by the gas to force lubricant from the chamber. In the present invention the means responsive to the pressure comprises a bellows 44, as most clearly shown in FIG. 4. The bellows 44 is typically of polyamide and, in a preferred embodiment is made of the nylon available under the trade mark PEBAX. The bellows is formed with corrugations 46 enabling its expansion and contraction. It is closed at one end 48 and is formed at its base with a flange 50.

A piston 52 is also located in the lubricant chamber 2. In the illustrated embodiment—see FIG. 3—the bellows 44 expands on the generation of gas to push against piston 52 which is a gastight slidable fit within the chamber 2.

The apparatus includes a collar 54 to which the lubricant chamber 2 is threadedly attached at 56. The base member 30 is clamped between the collar 54 and member 58, which includes the reaction chamber 10 and a recess 60 to receive the batteries 16. As shown in FIG. 2, member 58 may be formed with bracing ribs 62. Bellows 44 is then clamped by an internal flange 64 on the lubricant chamber 2 abutting a flat 66 on the member 58. Flat 66 may be formed with projection 67 to assist in sealing. O-ring 68 seals base member 30 to member 58.

To use the device of the present invention it is clamped in position with thread 8 attached to a grease line for whatever is desired to be lubricated, typically a bearing. A screw 32, which of course functions as a switch, is withdrawn, depending upon the needed time of operation, as shown to the left in FIG. 3 and the circuit across the reaction chamber thus established. Lubricant chamber 2 is, of course, full of grease. As the gas is generated it expands bellows 44 which moves the piston 52 which forces grease from the chamber through outlet 4.

The bellows 44 has a great number of advantages over the prior art but in particular has the great virtue of consistency of performance. That is regardless of external pressure or temperature the bellows, as illustrated in FIG. 4 according to the preferred embodiment of the invention, provides particularly uniform performance. In the prior art bellows would not, of course, be present but neoprene and rubber devices have been used, typically in the form of a diaphragm. However the stretch curve of such a diaphragm varies markedly. That is its elastic properties differ markedly depending upon the external pressure and the amount of stretching that it has undergone. Furthermore rubber and neoprene have less desirable temperature responsive characteristics. Rubber at relatively cold temperatures requires much greater pressures to stretch it and at low temperatures, for example minus 40° C., can require such pressure to stretch that it will not be effective in the lubricating apparatus of the type according to the present invention.

The nylon bellows will not become brittle until minus 94° C. but rubber becomes brittle at about minus 64° C.

Various circuits useful with the apparatus of the present invention and, in particular, built into the printed circuit board 28 on the base member 30 of the apparatus are illustrated in FIGS. 5, 6, 7 and 8. The circuit of FIG. 5 is most simple and comprises a 3 volt power source, typically two AA batteries 16, mounted within the recess 60. A light emitting diode LED 70 is arranged in series with resistor 72 and with transistor 74. A second transistor 76 is in series with the first and emitter 78 communicates with line 80.

Resistors 82, 84 and 86 are positioned in series with a third transistor 88. The electrochemical reactor 10 is arranged as shown particularly in FIG. 3 and power supply to the reactor 10 is controlled by resistors 18 to 26, each controlled by switches 32. The arrangement is such that current is applied to the electrochemical reactor and, depending on the number of switches 32 that are closed, the period of reaction within the reactor, and thus of gas generation, is controlled. The LED 70 indicates when current flows in the circuit, that is when the device is in operation.

FIG. 6 differs from FIG. 5 only by the provision of a pressure sensing device 90 to vary the current in the circuit depending on ambient pressure. The sensing of ambient pressure permits the operation of a shunt 92 to vary the current to the electrochemical reactor 10 and thus the supply of lubricant. If the external pressure increases then the generated pressure, that is the volume of gas generated, should be increased.

FIG. 7 illustrates a more complicated variation of the circuits of FIGS. 5 and 6. It differs from those circuits by the fact that pressure sensing device 90 is able to shunt any selected timing circuit. In FIG. 7 the time for which the device is operable with the numbers of resistors 18 to 26 switched into the circuit is shown.

The circuit again has a current source 16, typically in the form of AA batteries joined in series, across the electrochemical reactor. Resistance 94 is in series with the reactor 10. The circuit has transistor 96 shunted by line 98 containing resistor 100 and transistor 102. Transistor 102 is in series with capacitor 104. An LED 106 is present with resistor 108 in parallel and resistor 110 in series. Capacitor 112 is in series with resistor 110. Transistor 114 is in series with resistor 116 and with transistor 118. Resistor 120 is the equivalent of resistor 84 in the circuit of FIG. 6. Transistor 118 is in series with resistor 122.

The circuit shown in FIG. 8 is a simple indication of the use of an external source 124 feeding through a transformer to provide power to the circuit. The external source 124 may, for example, be a battery of a vehicle, especially where the lubricating apparatus is mounted on a vehicle. The circuit includes sockets 126, resistor 128 and switch 130, typically mounted conveniently, for example on the facia of a vehicle.

I claim:
1. A lubricating apparatus comprising a base member; a lubricant chamber threadedly received within the base member;
   an outlet for lubricant in the lubricant chamber;
   a gas generating device to generate gas to develop pressure and including:
   (a) a plurality of resistors located in the base member;
   (b) switch means to permit variation of the resistance of the resistors;
   (c) a reaction chamber received within the base member and adapted to receive a power source;
   (d) an outlet for the reaction chamber;
   a bellows responsive to the pressure to force lubricant from the chamber, said bellows being mounted on the reaction chamber with the hollow interior communicating with the outlet for the reaction chamber, said bellows being clamped into position between the reaction chamber and the lubricant chamber; and
   an electronic circuit able to compensate for variations in ambient pressure.

2. Apparatus as claimed in claim 1 in which the bellows acts against a piston that contacts and moves lubricant through the outlet.

3. Apparatus as claimed in claim 1 having corresponding flanges on the reaction chamber and the lubricant chamber;
   a peripheral flange on the base of the bellows to clamp between the reaction chamber and lubricant chamber flanges.

4. Apparatus as claimed in claim 1 including a circuit to allow the application of pulsating power from the power source.

5. Apparatus as claimed in claim 1 including a circuit enabling operation of the device from an external power source.

6. Apparatus as claimed in claim 1 in which the bellows is of a polyamide.

7. Apparatus as claimed in claim 6 in which the bellows has a base flange to permit its clamping within the device.

8. Apparatus as claimed in claim 1 in which the gas is generated in a reaction chamber by the application of a voltage across an anode and a cathode in the chamber.

9. Apparatus as claimed in claim 8 in which the anode and cathode are of carbon fiber.

10. Apparatus as claimed in claim 8 in which the voltage is applied by dry cells.

11. Apparatus as claimed in claim 10 including a plurality of resistors between the cells and the reactor; switch means for each resistor; whereby the voltage applied to the reaction chamber can be varied to control the rate of gas generation.

* * * * *

UNITED STATES PATENT AND TRADEMARK OFFICE
CERTIFICATE OF CORRECTION

PATENT NO. : 4,671,386
DATED : June 9, 1987
INVENTOR(S) : Anton Orlitzky

It is certified that error appears in the above-identified patent and that said Letters Patent is hereby corrected as shown below:

Column 1, line 14, after "that" delete "is".
Column 1, line 30, after "apparatus insert -- , --

Column 1, line 34, after "However" insert -- , --.
Column 1, line 53, after "invention is" delete "in".
Column 3, line 6, change "gastight" to -- gas-tight --.
Column 4, line 23, beginning of the sentence change "An" to -- A --.

Signed and Sealed this

Fifth Day of January, 1988

Attest:

DONALD J. QUIGG

*Attesting Officer*   *Commissioner of Patents and Trademarks*